Figure 1:
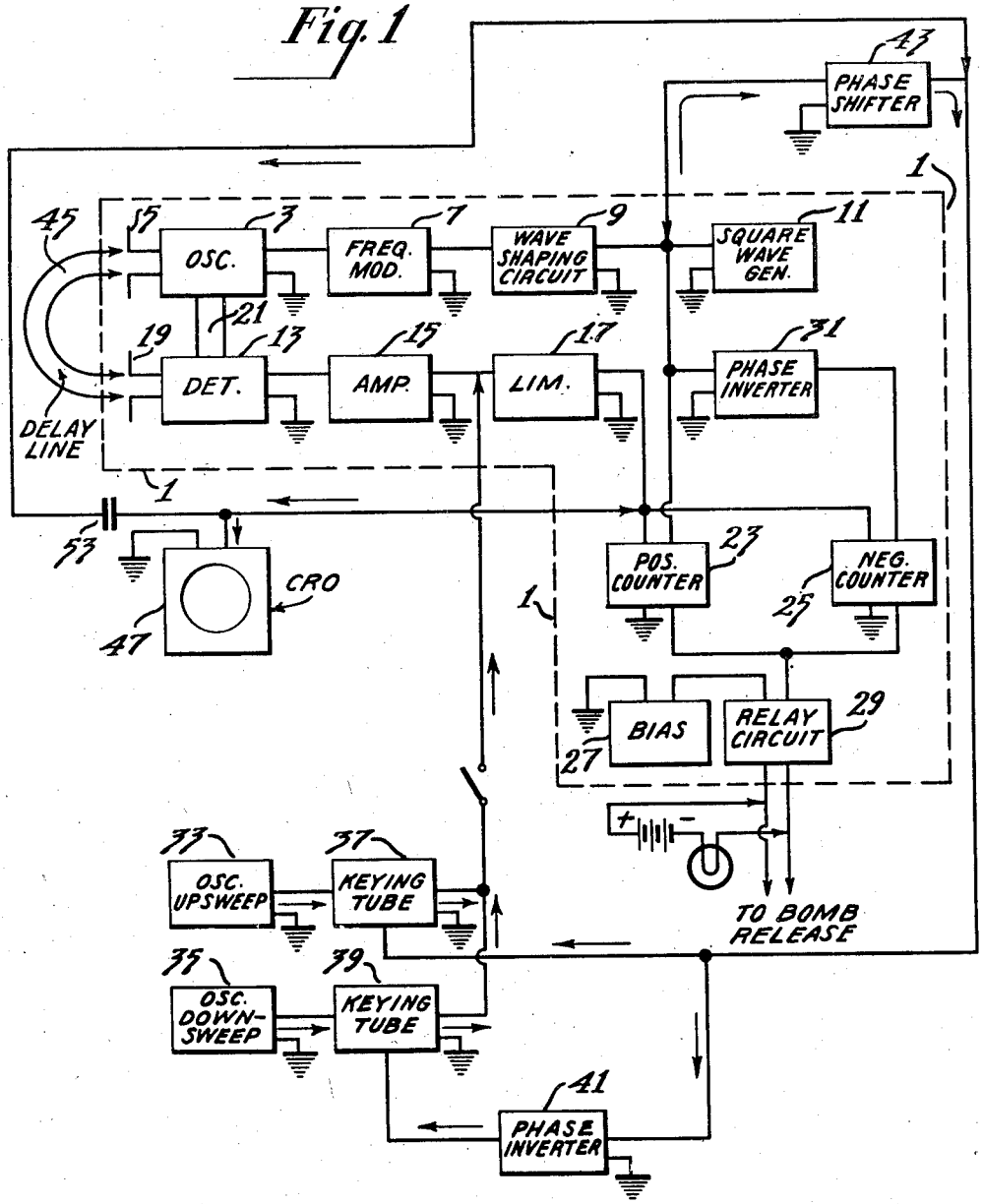

Dec. 14, 1948.  R. L. HARVEY  2,455,996
FREQUENCY MODULATED RADIO TESTING SYSTEM
Filed Dec. 15, 1945  2 Sheets-Sheet 1

INVENTOR.
Robert L. Harvey
BY
ATTORNEY

Dec. 14, 1948.                R. L. HARVEY                2,455,996
         FREQUENCY MODULATED RADIO TESTING SYSTEM
Filed Dec. 15, 1945                              2 Sheets-Sheet 2
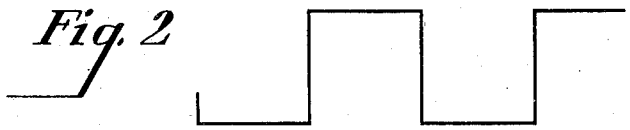
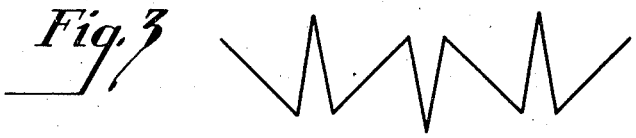
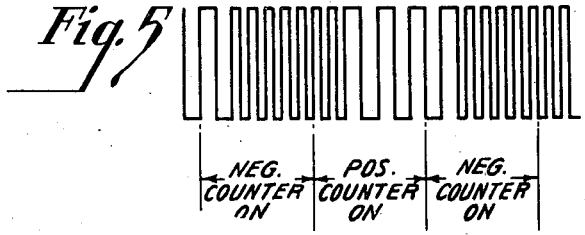
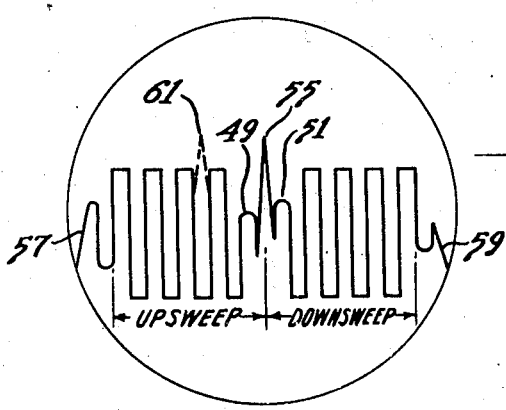
INVENTOR.
Robert L. Harvey
BY
ATTORNEY Patented Dec. 14, 1948

2,455,996

UNITED STATES PATENT OFFICE 2,455,996

FREQUENCY MODULATED RADIO TESTING SYSTEM

Robert L. Harvey, Princeton, N. J., assignor to Radio Corporation of America, a corporation of Delaware Application December 15, 1945, Serial No. 635,337

3 Claims. (Cl. 343—5)

This invention relates to improvements in the art of testing and calibrating radio systems of the type wherein frequency modulated signals are transmitted to, and received after reflection by, a selected target to provide operation in accordance with the range and speed of said target. One such system, as applied to the automatic release of bombs from aircraft, is described in copending U. S. patent application Serial No. 524,-794, filed March 2, 1944, by Royden C. Sanders, Jr., et al., which issued as Patent No. 2,412,632, December 17, 1946, and is entitled Radio bomb release system.

The principal object of the instant invention is to provide improved methods of and means for testing and calibrating such systems.

Another object is to provide means for simulating the normal operating conditions for system of the described type, enabling calibration to be made in the laboratory.

The invention will be described with reference to the accompanying drawings, wherein:

Figure 1 is a schematic block diagram of a bomb release system of the type described in the above-mentioned Sanders application, together with the system of the present invention, Figure 2 is an oscillogram of a square wave voltage produced in the operation of the system of Figure 1, Figure 3 is an oscillogram of the modulating voltage derived from the square wave voltage of Figure 2, Figure 4 is a graph of the variations in frequency of signals transmitted and received in the operation of the system of Figure 1, and Figure 5 is an oscillogram of a beat voltage occurring in the operation of the system of Figure 1.

Fig. 6 is an oscillogram occurring on the face of the tube 47 when the altimeter is under test with the test elements attached.

Reference is made first to Figure 1, wherein the equipment to be calibrated is represented by the portion of the diagram enclosed by the dash line 1. In the present illustration this equipment comprises three portions: a frequency modulated transmitter, a receiver, and a computer circuit.

The transmitter includes a high frequency oscillator 3 connected to an antenna 5 and to a frequency modulator 7. The modulator 7 is of the vibratory variable capacitor type, like that described in copending U. S. application Serial No. 471,003, filed January 1, 1943, by Sydney V. Perry and entitled Capacity modulator unit. The modulator 7 is energized through a wave shaping circuit 9 by the output of a square wave generator 11. The wave shaping circuit 9 may be of the type described in copending U. S. patent application Serial No. 546,537, filed July 25, 1944, by Royden C. Sanders, Jr. which issued as Patent No. 2,403,616, July 9, 1946, and is entitled Wave shaping circuits. The square wave output of the generator 11 is modified by the wave shaping circuit 9 to a form such as to energize the modulator 7 to provide substantially linear symmetrical sawtooth wave variation in frequency of the oscillator 3.

The receiver system comprises a detector 13, preferably of the balanced type such as that described in copending U. S. patent application Serial No. 445,720, filed June 1, 1942, by Royden C. Sanders, Jr., which issued as Patent No. 2,420,-199, May 6, 1947, and is entitled Frequency modulated altimeter or distance indicator, an amplifier 15 connected to the output circuit of the detector, and a voltage limiter circuit 17 connected to the amplifier 15. The detector 13 is connected to an antenna 19, like the antenna 5, and to the oscillator 3 through a transmission line 21.

In the normal operation of the system, the frequency modulated output of the oscillator 3 is transmitted toward a selected target (not shown), from which it is partially reflected to the receiver antenna 19. Some of the transmitted signal is applied directly to the detector through the line 21. Since the oscillator is constantly varying in frequency, the signal applied to the detector from the antenna 19 will differ in frequency from that applied to the detector through the line 21 by an amount depending upon the time required for the transmitted signal to travel to and return from the target. The beat, or difference frequency appears in the output of the detector 13 and is amplified by the amplifier 15 and limited to a constant amplitude by the limiter 17.

If the distance to the target is decreasing, Doppler effect will cause the received signals to increase in frequency by an amount proportional to the rate of change of distance. This makes the beat frequency lower during the periods when the transmitter frequency is increasing, and higher during decrease of transmitter frequency.

Thus the output of the limiter 17 is an alternating voltage of constant amplitude, cyclically changing from one frequency $f_1$ to another frequency $f_2$. The average of $f_1$ and $f_2$ is proportional to the target distance, and the difference of $f_1$ and $f_2$ is proportional to the rate of change of said distance.

The computer system comprises a pair of averaging cycle counters 23 and 25, a bias source 27, and a relay circuit 29. The counters 23 and 25 are of the type described in the above-mentioned Sanders et al. Patent No. 2,412,632, each providing, when operating, unidirectional output of magnitude depending upon the frequency of the respective input. The counter 23 is connected to provide an output of positive polarity with respect to ground potential, and the counter 25 provides an output of negative polarity with respect to ground potential. Both counters are connected to the relay circuit 29, as is the bias source 27.

The input circuit of each of the counters 23 and 25 is provided with a control element which, when positive, allows the counter to operate, and when negative, prevents operation. The control circuit of the counter 23 is connected directly to the square wave generator 11, so that the counter 23 receives a positive voltage and is operative while the frequency of the oscillator 3 is increasing. The control circuit of the counter 25 is connected to the square wave generator 11 through a phase inverter 31, so that it operates only when the transmitted frequency is decreasing. Thus the output of the positive counter 23 corresponds in magnitude to the frequency $f_1$, and that of the negative counter 25 corresponds in magnitude to the frequency $f_2$.

The sensitivities of the counters 23 and 25 are not equal, but are adjusted in accordance with the relationship between target distance and speed which is required to be fulfilled for correct bomb release, as described in the above-mentioned Sanders Patent No. 2,412,632. In normal operation, the sum of the outputs of the counters 23 and 25 and the bias provided by the source 27 is such as to actuate the relay circuit 29 at the proper instant for release, energizing the bomb release mechanism, not shown.

As described more fully in said Sanders application Serial No. 524,794, it is necessary to adjust the sensitivities of the counters 23 and 25 and the bias provided by the source 27 to secure correct operation of the computer system. This may be done by making "dry runs," that is, actually flying over a target and observing the operation, making the necessary adjustments to cause release to occur properly. Such procedure is costly and time consuming. Another method of calibration involves the use of various length of delay lines connected from the transmitter antenna to the receiver antenna to simulate various known target ranges, and a phase modulator of the type described in copending application Serial No. 516,254, filed December 30, 1943, by Royden C. Sanders, Jr., et al., which issued as Patent No. 2,409,449 on October 15, 1946, and is entitled Phase modulators, to simulate the relative velocity or rate of change of range. This procedure is unsatisfactory when relatively long delay lines are required, particularly if the carrier frequency of the oscillator 3 is very high, principally because the attenuation in the long line is so high that the signal arriving at the receiver is insufficient to cause proper operation of the counter circuits.

A third method of calibration, and the one which is used in the practice of the present invention, employs two local oscillators for simulating the two beat frequencies occuring during increase and decrease respectively of transmitter frequency. The two beat frequencies (upsweep and downsweep) corresponding to any combination of target range and speed may be calculated. This is done for a number of such combinations, and the results set up in tabular form for the convenience of the operator. The oscillator 33 is set to the calculated upsweep beat frequency, and the oscillator 35 is set to the downsweep frequency. The outputs of the oscillators 33 and 35 are applied to keying tubes 37 and 39 respectively to the input circuit of the limiter 17. Keying input voltage is applied to the tube 37 from the square wave generator 11 and to the keying tube 39 through a phase inverter 41. Thus the output of the oscillator 33 is applied to the limiter 17 while the counter 23 is operative, and the output of the oscillator 35 is applied to the limiter 17 while the counter 25 is operative.

Owing to inertia effects in the frequency modulator 7, and to phase shift in the wave shaping circuit 9, the variations in frequency of the oscillator 3 lag the square wave voltage output of the generator 11. The term "modulator lag," as used hereinafter, is intended to mean all of this lag, including both that caused by inertia and that caused by phase shift. Figure 2 shows the square wave output of the generator 11. Figure 3 shows the output of the wave shaping circuit 9 comprising a pulse component superimposed upon a symmetrical triangular wave, as described in the above-mentioned Sanders Patent No. 2,403,616. The solid line 43 of Figure 4 represents the resulting variations in frequency of the oscillator 3. It is seen that the frequency continues to decrease for a period D after the initial edge of the square wave of Figure 2, when it begins to increase, continuing to increase for a corresponding period after the end of the square wave. The frequency of the signal reflected from the target and received at the antenna 19 is represented by the dash line 44 of Figure 4. The resulting beat voltage output of the limiter 17 is shown in Figure 5. The closely spaced portions represent the downsweep beat signal of frequency $f_2$ while the more widely spaced portions represent the upsweep beat voltage of frequency $f_1$.

The switching of the counters 23 and 25 in response to the square wave generator 11 is substantially instantaneous. Thus the negative counter 25 is operative during a period D of the upsweep cycle, and the positive counter is operative during the corresponding portion of the downsweep cycle. This affects the calibration of the system, since it produces appriximately the same results as would a decrease in the response of the system to speed, with an increase in the range response. While it could be taken into account in calculating the frequencies to which the oscillators 33 and 35 are to be adjusted for simulating each particular combination of range and speed, this is not ordinarily practical because the relay in the modulator is not accurately known and differs with each different modulator.

According to the practice of the present invention, the modulator lag is simulated by a delay network or phase shifter 43 in the connection from the square wave generator 11 to the keying tubes 37 and 38. The phase shifter 43 is preferably of the type described in copending U. S. patent application Serial No. 635,376, filed on the same date as the instant application by Harwick Johnson, and entitled Delay circuit for rectangular waves, but may be any known device for producing an adjustable delay in the square wave output of the generator 11.

To enable adjustment of the phase shifter 43 to provide the same amount of delay as the modulator 7, a delay line 45 is connected temporarily from the antenna terminals of the transmitter to those of the receiver. The length of the line 45 is not critical, but it must be short enough to avoid the introduction of excessive attenuation.

A cathode ray oscilloscope 47, having the usual vertical deflection and horizontal sweep circuits, is synchronized with the square wave generator 11. The vertical deflection input circuit is connected to the limiter 17, and through a small capacitor 53 to the output of the phase shifter 43.

With the above-described connections, the fluorescent screen of the cathode ray oscilloscope presents an image substantially as shown in Figure 6. Since the delay line 45 is of constant length, the beat frequency during upsweep is the same as that during downsweep. The "turn around," or instant of reversal of the modulation between upsweep and downsweep, is indicated clearly by the irregularities 49 and 51 in the limiter output wave. These result from the fact that the beat frequency is not an exact multiple of the modulation frequency of the generator 11. The sharp pulse 55 is derived from the trailing edge of the square wave output of the phase shifter 43, as a result of differentiation by the small capacitor 53. The leading edge of the phase shifter output wave also provides pulses, parts of which appear at 57 and 59. These are of opposite polarity to the trailing edge pulse 55.

If the phase shifter 43 were set to provide zero phase shift, the pulse 55 would not coincide with the "turn around" point, but would lead it by an amount equal to the modulator lag. This is shown at 61 in Figure 6, in dash line. The phase shifter 43 is adjusted to bring the pulse to the "turn around" point, as shown by the solid line 55. The delay provided by the phase shifter is then equal to the modulator lag.

After the adjustment of the phase shifter is made, the delay line 45 is removed and the outputs of the keying tubes are applied to the input of the limiter 17. The keying from one to the other of the oscillators 33 and 35 lags the switching of the counters 23 and 25 by the delay in the circuit 43, and thus the input to the limiter 17 simulates exactly the beat signals which would reach it under actual operating conditions. The modulator lag does not enter into the calculations of the frequencies $f_1$ and $f_2$ to which the oscillators must be adjusted, being compensated by the phase shifter 43.

Summarizing briefly, the present invention has been described as an improved method of and system for calibrating the computer circuits of a radio bomb release system of the type using frequency modulated signals and two differentially responsive beat frequency responsive counters, operative during upsweep and downsweep respectively. Upsweep and downsweep beat signals are simulated by oscillators, alternately keyed in response to the modulation signal. The oscillator keying is made to lag the modulation signal to compensate lag in the modulator to provide accurate simulation of actual operating conditions.

I claim as my invention:

1. Apparatus for testing the operation of a radio bomb release system of the type including a radio transmitter, a source of modulation signals, a frequency modulator connected to said transmitter and responsive, with substantial lag, to said modulation signals to vary the frequency of said transmitter, a radio receiver responsive to the output of said transmitter as transmitted and as received after reflection by a selected target to provide beat frequency signals, and two differential beat frequency responsive means alternately operable, with substantially no lag, in response to said modulation signals; said apparatus including a pair of oscillators adjustable in frequency to simulate respectively beat signals which occur during increase and decrease respectively of the frequency of said transmitter in the normal operation of said bomb release system, keying circuits for alternately connecting said oscillators to said beat frequency responsive means, and means for applying said modulation signals to said keying circuits, said last-mentioned means including a phase shifter adjustable to provide a lag in said keying substantially equal to said lag in the response of said modulator to said modulation signals.

2. Apparatus for testing the operation of a radio bomb release system of the type including a radio transmitter, a source of modulation signals, a frequency modulator connected to said transmitter and responsive, with substantial lag, to said modulation signals, a radio receiver, and two differential beat frequency responsive means connected to said receiver and alternately operable, with substantially no lag, in response to said modulation signals; said apparatus including a pair of oscillators adjustable in frequency to simulate respectively beat signals which occur during increase and decrease of frequency of said transmitter in the normal operation of said bomb release system, keying circuits for alternately connecting said oscillators to said beat frequency responsive means, and means for applying said modulation signals to said keying circuits, said last-mentioned means including a phase shifter adjustable to provide a lag in said keying substantially equal to said lag in the response of said modulator to said modulation signals.

3. Apparatus for testing the operation of a radio bomb release system of the type including a transmitter, a source of modulation signals, a frequency modulator responsive, with substantial lag, to said modulation signals, to vary the frequency of said transmitter, and two differential beat frequency responsive means alternately operable, with substantially no lag, in response to said modulation signals; said apparatus including a pair of oscillators adjustable in frequency to simulate respectively beat signals which occur during increase and during decrease in frequency of said transmitter in the normal operation of said bomb release system, keying circuits for alternately connecting the oscillators to said beat frequency responsive means, and means for applying said modulation signals to said keying circuits, said last-mentioned means including a phase shifter adjustable to provide a lag in said keying substantially equal to said lag in the response of said modulator to said modulation signals.

ROBERT L. HARVEY.

REFERENCES CITED

The following references are of record in the file of this patent:

UNITED STATES PATENTS

| Number | Name | Date |
| --- | --- | --- |
| 2,198,113 | Holmes | Apr. 23, 1940 |
| 2,407,684 | Roberts | Sept. 17, 1946 |